Feb. 13, 1968

JAMES E. WEBB 3,369,222

ADMINISTRATOR OF THE NATIONAL AERONAUTICS
AND SPACE ADMINISTRATION
DATA COMPRESSOR

Filed June 24, 1965

INVENTORS
EDWARD C. POSNER
ISIDORE EISENBERGER
TAGE O. ANDERSON
WARREN A. LUSHBAUGH
BY

ATTORNEYS

INVENTORS
EDWARD C. POSNER
ISIDORE EISENBERGER
TAGE O. ANDERSON
WARREN A. LUSHBAUGH
BY
ATTORNEYS

Feb. 13, 1968  JAMES E. WEBB  3,369,222
ADMINISTRATOR OF THE NATIONAL AERONAUTICS
AND SPACE ADMINISTRATION
DATA COMPRESSOR

Filed June 24, 1965 6 Sheets-Sheet 5

INVENTERS
EDWARD C. POSNER
ISIDORE EISENBERGER
TAGE O. ANDERSON
WARREN A. LUSHBAUGH
BY
ATTORNEYS

FIG. 6

INVENTORS
EDWARD C. POSNER
ISIDORE EISENBERGER
TAGE O. ANDERSON
WARREN A. LUSHBAUGH
BY
ATTORNEYS

United States Patent Office 3,369,222
Patented Feb. 13, 1968

3,369,222
DATA COMPRESSOR
James E. Webb, Administrator of the National Aeronautics and Space Administration with respect to an invention of Edward C. Posner, Altadena, Isidore Eisenberger, Pasadena, Tage O. Anderson, Arcadia, and Warren A. Lushbaugh, Los Angeles, Calif.
Filed June 24, 1965, Ser. No. 466,875
14 Claims. (Cl. 340—172.5)

ABSTRACT OF THE DISCLOSURE

A data compressor which includes a counter to provide a number or count at the end of each of Y observation periods which represents the number of observed events which cannot exceed X. A binary type serial memory which stores X consecutive ones, followed by Y consecutive zeroes is read out at the end of each period. When the number of ones which are read out equals the number of observed events a zero is inserted among the ones. Thus at the end of the Y periods, the Y zeroes are dispersed among the X ones, with the number of ones preceding each zero representing the number of events observed during a different period.

Origin of invention

The invention described herein was made in the performance of work under a NASA contract and is subject to the provisions of Section 305 of the National Aeronautics and Space Act of 1958, Public Law 85–568 (72 Stat. 435; 42 USC 2457).

The present invention relates to a data compression system and more particularly to improvements therein.

Generally, when information is desired about the distribution of the occurrence of events, an experimental distribution or histogram is produced by storing or recording the number of events which are observed during each of a sufficiently large number of observation periods. The histogram is basically a graph wherein the number of events occurring during each observation period is plotted against the number of periods during which the same number of events were observed.

In order to produce a meaningful histogram, the number of observation periods is generally quite large and if the maximum number of events which may occur during each period is similarly large, a great amount of data must be recorded. Also a system must be devised to reproduce the data in order to produce the histogram from which the information about the distribution of the occurrences of events may be derived. Such a system with sufficient storage capacity and readout capabilities would be extremely complex and quite large and expensive.

The complexity and size of a system which could be built with presently known techniques are particularly disadvantageous for use in space vehicles in which the available space is limited. Also, the complexity of the system increases the possibility of malfunctioning which often cannot be corrected in a vehicle traveling in space. In addition, one of the major drawbacks of using a system built by prior art techniques in a space vehicle is that a great amount of data would have to be transmitted from the vehicle to the ground in order to produce the desired histogram. Since, in space investigation transmitting channels must be apportioned among various systems used to gather and analyze various types of data, the need to send a large amount of data to produce a histogram is most undesirable.

Accordingly, it is an object of the present invention to provide a novel system for recording and reading out data related to the distribution of the occurrence of a plurality of events.

Another object of the invention is the provision of a relatively simple system for receiving and producing data to provide a histogram.

Yet another object is the provision of a relatively compact system capable of recording the number of events observed during each of a plurality of periods in a novel arrangement requiring a minimum amount of recording capacity.

Still a further object of the invention is the provision of a simple system for compressing data related to the occurrence of events observed during each of a plurality of periods and for providing a minimal amount of data from which a satisfactory histogram of the events can be produced.

These and other objects of the invention are achieved by providing a relatively simple system which includes mainly counters, comparing circuits and a serial memory unit which are controled by a master control stage. The system is very compact and relatively light thus adapting it for use in space exploration. Also the system can be operated to record all the data necessary for the formation of the histogram, i.e. the number of events observed during each period and the number of observation periods, but transmits only a minimal amount of data from which a most satisfactory histogram may be produced.

The system incorporates a novel arrangement for recording all the observed data in a serial memory unit which comprises a multibit circulating delay line. The novel use of the line in a manner to be explained hereafter in detail greatly reduces the size of the recording or memory unit which would have had to be used with prior art storage or recording techniques. When the system of the invention is used in a space vehicle, any complex arithmetic units and/or stored computer programs necessary to produce the histogram received from the system may be located at a remote ground location so that only a minimum amount of equipment need be placed aboard the vehicle.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
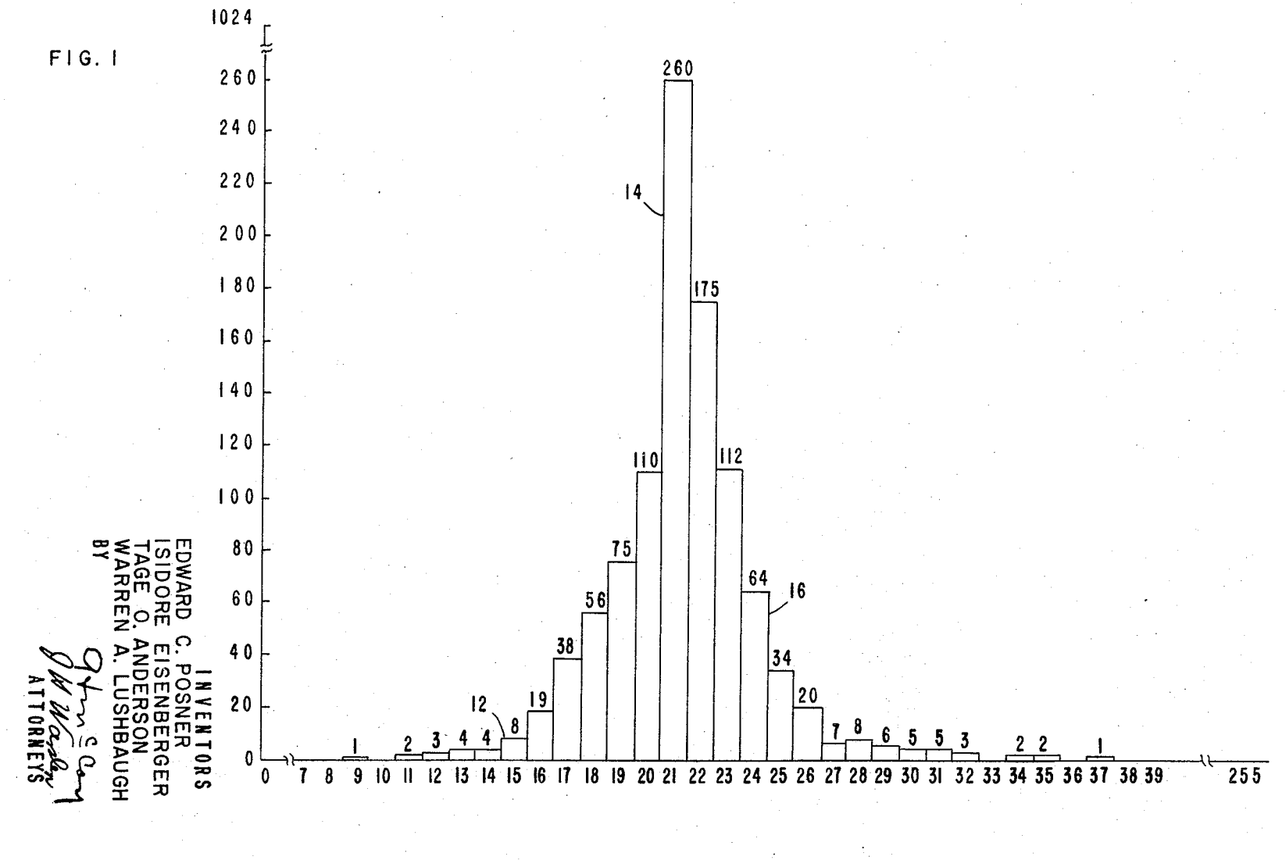
FIGURE 1 is a histogram curve useful in explaining the present invention.

The novel teachings of the present invention will hereafter be explained in conjunction with a specific example. For explanatory purposes, it is assumed that the system is designed to observe the number of events such as the number of particles received during each of 1024 periods each period being one second in length. It is further assumed that the maximum expected number of particles which may be received at any one second period does not exceed 255. One example of a histogram or experimental distribution of the particles is shown in FIGURE 1 to which reference is made herein. The abscissa represents the number of particles counted in one second, and the ordinate designates the number of times a certain number of particles were counted. Thus, the histogram may be thought of as comprising 256 vertical bars (including a bar for zero particles per second). The height of each bar represents the number of times a certain number of particles were counted. For example, bars 12, 14 and 16 represent that fifteen, twenty-one and twenty-four particles per second were counted eight, two hundred sixty and sixty-four times respectively.

It should be appreciated that if conventional binary data recording techniques were used, an 8-bit word is required to store the particles received in any given second, it being assumed that the number of particles will not be more than 255. Since the sampling is taken over 1024 seconds, 8192 bits of storage data would be required every 1024 seconds. Furthermore, if a conventional system were placed aboard a space vehicle, a portion of the transmission channel thereof would have to be allocated to the system so that during every 1024 seconds, 8192 bits of stored data are transmitted to the ground. Since in a space vehicle, many experiments are being performed simultaneously and the same communication channel is used to transmit the results of all the experiments, it is most desirable to limit the total number of results that need be transmitted from each experiment without affecting the usefulness of the received results.

From statistical studies and analysis in conjunction with deriving information on a parent distribution of events such as particles, it has been found that meaningful information can be derived by using only a portion of the data which is accumulated to produce a conventional histogram. Basically, according to the teachings of the invention, the data necessary to form a histogram, i.e. the number of particles received during each of 1024, is gathered and recorded in a novel manner to be described hereafter. However, when the system is in a space vehicle instead of transmitting 1024 8-bit words, the system provides only several numbers which interrelate the number of samplings with the number of particles counted per second.

These numbers which in one actual reduction to practice did not exceed four in number, have been found to be sufficient to provide the desired information as if almost all the 1024 8-bit words were received. Each of the selected numbers, hereafter referred to as a quantile may be defined as a number Q representing a count of Q particles per second such that $100p$ percent of the number of observations, contained Q or less particles, $p$ being the order of the quantile. When four numbers or quantiles are to be derived, four $p$ numbers paired about the value 0.500 are determined. The latter four numbers, such as 0.067, 0.291, 0.709, and 0.933 multiplied individually by the total number of sampling periods 1024 yield four values $r_1=69$, $r_2=298$, $r_3=726$ and $r_4=955$. The first quantile is a number or count, such that during each of 69 of the 1024 seconds, the number of particles counted is equal to or smaller than the quantile. For example, in the histogram of FIGURE 1, the number adjacent the top of each bar represents the number of periods that the same count was observed. Then, it is seen that the first quantile is 17 since during each of 69 seconds, 17 or fewer particles were observed per second. Similarly, the second quantile (for $r_2=298$) is 20 since during at least each of 298 (actually 320) seconds, 20 or fewer particles were recorded. The third and fourth quantiles (for $r_3=755$ and $r_4=985$) are 22 and 26 respectively.

Since the largest number of a quantile is 256, each quantile can be transmitted as an 8-bit word. Thus, the four quantiles can be transmitted with 32 bits every 1024 seconds.

It should be appreicated that the four quantiles should be transmitted with a higher signal-to-noise ratio than that used if data were transmitted in the form of 1024 8-bit words. An error in one of the 1024 words would not be serious since it would be averaged out with the other 1023 words. However, an error in one out of four quantiles would greatly affect the value of the received information. The signal-to-noise ratio when transmitting the quantiles can be greatly improved by doubling the transmission time per quantile bit. Since each quantile is transmitted as an 8-bit word and each bit can be regarded as a double bit for transmission purposes, each quantile can be though of as requiring 16 bits. Since there are four quantiles, 64 bits need be transmitted every 1024 seconds as compared with 8192 bits when 1024 8-bit words are transmitted. Thus, by transmitting four quantiles a data compression ratio of 8192/64 or 128 to 1 is obtained.

The data compression by transmitting four quantiles instead of 1024 numbers would be of little value if the reliability of the information acquired (from the four quantiles) were proportional to the ratio of the number of quantiles used to the total number of observations. However, it has been found that this is not the case. From statistical studies and comparisons made on data derived from a relatively small number of quantiles (2 to 20) and that derived from all the sampled data (such as the 1024 numbers), it has been found that a high efficiency of estimate can be derived from the quantile data. The efficiency of an estimate is defined as the ratio of variance of the best estimate using all the sample values to the variance of the estimate using quantiles. For example, let us assume that a parent population (such as particles received over a 1024 second period) is normally distributed with an unknown mean $\mu$ and standard deviation $\sigma$. It has been found that by properly choosing relatively few quantiles such as 2 to 20, the efficiencies of the derived mean $\mu$ range as high as 0.99 and in the case of the standard deviation, as high as 0.98. Thus, it should be appreciated that by transmitting only a selected number of quantiles, a substantial compression of data can be accomplished without reducing the efficiency of estimates which can be derived from the compressed data, since the compressed data retains the reduction in uncertainty which accompanies a large sample.

Figure 2:
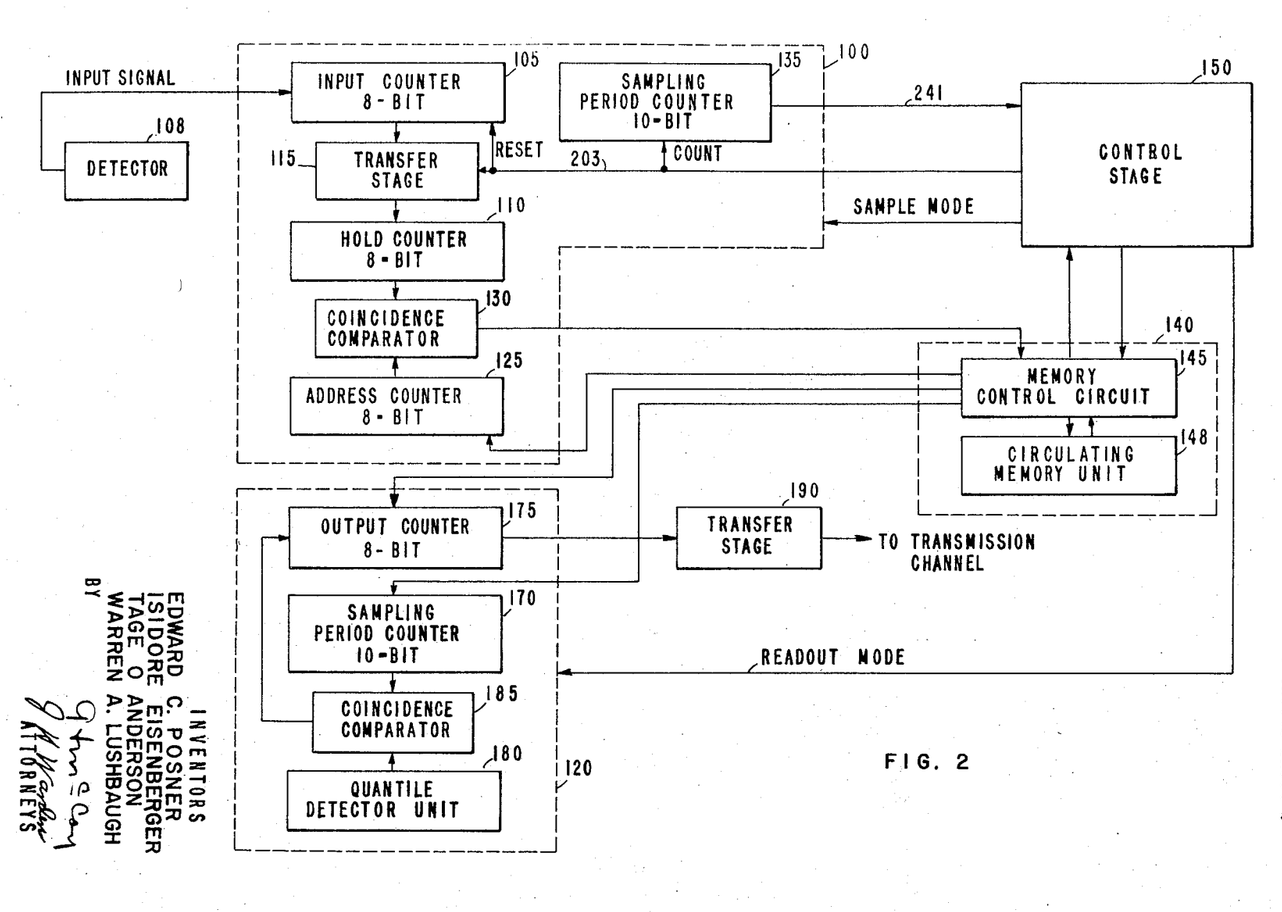
FIGURE 2 is a block diagram of the data compression system of the present invention.

Reference is now made to FIGURE 2 which is a simplified block diagram of one embodiment of the system of the present invention. The system includes an input stage 100, an output stage 120, a memory stage 140, and a control stage 150 which controls the operation of the other three stages.

The input stage 100 includes an input counter 105 which counts the number of input signals received from a detector 108. The detector 108 is assumed to detect or sense the occurrence of an event such as the reception of a particle and produce a signal in response thereto. Thus, counter 105 counts the number of events detected by detector 108. Since, as previously assumed, the maximum number of expected events per second is 255, the counter 105 is an 8-bit binary counter.

When the system is operated in the sample mode, namely, when the number of particles received during each second is recorded, the control stage 150 resets the input counter 105 at the end of each observation second. The same reset pulse or signal is also used to energize a transfer stage 115 to transfer the count accumulated in counter 105 during the previous second to an 8-bit hold counter or register 110. The transfer of the count is similar to the transfer of data from one register to another which is well known in the art. Thereafter, counter 105 starts counting the number of pulses received during a subsequent second of observation. For explanatory purposes, let it be assumed that the count transferred to hold counter 110 is fifteen indicating that during the previous second, fifteen particles were detected by detector 108.

During the sample mode, the control stage 150 actuates the memory stage 140 to continuously circulate and supply pulses to an address counter 125. The memory stage 140 comprises a circulating memory control circuit 145 used to control the operation of a circulating memory unit 148. Basically, the memory unit 148 employs delay lines as the storage medium. The unit may be considered to be a shift register whose length equals the number of digits of delay and which shift at a rate of clock pulses supplied from the control circuit 145. One example of such a recirculating memory unit is the serial memory unit SM–30 manufactured by Computer Control Company, Inc. of Framingham, Massachusetts. Continuous storage is achieved by feeding the output back to the input and recirculating the stored data. Information may be entered into the memory unit or removed therefrom during the interval that the output is fed back to the input.

In reducing the invention to practice in conjunction with the foregoing example (i.e. 1024 samples with a maximum of 256 particles per second), a recirculating memory unit of 1280 bits is used which is operated at a frequency of 1 megacycle (mc.) so that the entire memory can be read out in less than 1.3 milliseconds (ms.). As is appreciated by those familiar with the art, each binary bit stored in the computer may be read out as a DC level which indicates whether the stored bit is a binary "one" or "zero." These levels are then supplied to the circulating memory control circuit 145 wherein, as described hereafter, the levels are used to control the production of pulses which are related to the levels. Thus, the level of each bit is convertible into a related pulse which can be regarded as a "one" pulse or a "zero" pulse. Alternately, ones and zeroes can be supplied to the memory stage to be stored in the unit 148.

In accordance with the teachings disclosed herein, prior to sampling the number of particles received during each sampling second, the memory stage is controlled to store in unit 148, 256 ones and 1024 zeroes. The output levels which are produced by recirculating the memory unit 148 are diagrammed in FIGURE 3(a) to which reference is made herein. The levels are designated by "1" and "0." The numerals on top of level "1" represent the relative positions of "ones" in the memory unit while the numeral below the "1" level corresponds to zeroes in the memory unit. As seen, all the 256 "ones" are successively stored, followed by the 1024 zeroes.

As previously stated, during the sample mode, after a completed sampling period (one second), the count accumulated in counter 105 is transferred to hold counter 110. As previously assumed, a count of fifteen is in the hold counter. Thereafter, counter 105 resumes a new count of particle received during a subsequent period (one second). During the entire sample mode, the memory stage 140 is energized to recirculate the memory unit 148 and supply pulses corresponding to "ones" stored therein to an address counter 125. Counter 125 is coupled to hold counter 110 through a coincidence comparator. From FIGURE 3(a), it should be appreciated that as the memory unit 148 is recirculating, pulses corresponding to "ones" will be supplied to counter 125, so that when the count therein equals the count in counter 110, i.e. fifteen, a signal from comparator 130 is supplied to the control circuit 145. The levels related to the output of the memory unit 148 after 15 "one" bits have been read out are diagrammed in FIGURE 3(b). The signal from comparator 130 actuates the control circuit to store a zero after the 15th "one." The zero is designated by numeral 160 in FIGURE 3(c).

From the last referred to figure, it is seen than when the zero 160 is stored after the 15th "one," the memory unit 148 actually stores 256 "ones" and 1025 "zeroes." 1024 of the zeroes are between the 256th "one" and the first "one" and the 1025th zero (100) is stored after the 15th "one." The additional storage capacity of one bit is provided by completing the circulating of the memory unit 148 as diagrammed in FIGURE 3(c) through an additional one bit delay stage until the first zero stored after the last 256th one is detected. Then the first zero is removed and the recirculation of the unit is completed.

FIGURE 3(d) represents the information stored in the memory unit 148 at such time. As seen, FIGURES 3(a) and 3(d) are similar except that in FIGURE 3(d) zero 160 is inserted between the 15th and 16th "ones." Also, the number of "zeroes" following the ones is only 1023. Thus, it is seen that as a result of the first comparison between the contents of counters 110 and 125 (i.e. the count fifteen) a zero is inserted after the 15th one.

Let it be assumed that during a subsequent sampling second, the count accumulated in counter 105 is twenty. Then from the foregoing, it should be appreciated that at the end of the period, counter 105 will be reset and will transfer the count twenty to hold counter 110. Since the memory unit 148 (FIGURE 3(d)) continuously recirculates, supplying the "one" pulses to counter 125, after the 20th "one," as diagrammed in FIGURE 3(e), the count (twenty) will be the same in both counters 110 and 125. Comparator 130 will then energize control circuit 145 to store a zero designated by numeral 162 in FIGURE 3(f) after the 20th "one."

The operation of the system in the sample mode, as hereinbefore described, continues for 1024 seconds. The number of particles counted in each second is recorded by storing a zero in unit 148 after a number of ones which equals the number of counted particles. Thus at the end of 1024 seconds, the distribution of the zeroes and ones stored in the memory unit 148 is as diagrammed in FIGURE 3(h) which could best be explained in connection with the histogram of FIGURE 1. As seen from FIGURE 1, the minimum number of particles counted per second is nine and this number was only observed during a single period. This is indicated in FIGURE 3(h) wherein the first zero ($1_0$) is shown stored after the 9th one. No zeroes are stored after the 10th one. However, two zeroes are stored after the 11th one indicating that out of the 1024 sampling periods, eleven particles were counted during two of the periods. The rest of the zeroes are similarly distributed among the ones in such a manner that the number of ones from the beginning of the memory unit which precede a given zero or group of zeroes represents the number of particles counted during one or more observation periods.

From the foregoing description of the teachings of the present invention, it should thus be appreciated that 1024 numbers or words, each of a maximum count of 256, i.e. 8-bits, can be stored in a recirculating serial memory of 1280 (1024+256) bits, whereas prior art systems require a memory storage capacity of 8192 bits. Also, the novel teachings disclosed herein provide a system whereby data related to events such as received particles observed during a plurality of observations, can be conveniently stored in a circulating memory unit without resort to expensive arithmetic units and complex programs needed in prior art systems.

Referring again to FIGURE 2, there is shown a sampling period counter 135 which is stepped at the end of each sampling period (second) by the pulse from the control stage 150 which also resets counter 105. The sampling period counter 135 is a 10-bit unit so that at the end of 1024 seconds, it actuates the control stage to indicate the completion of the sampling mode. In response to the signal from counter 135, control stage 150 switches the system to a readout or quantile mode during which only readout stage 120 and memory stage 140 are energized. The stage 120 includes another sampling period counter 170 which is connected to receive the zero pulses produced by control circuit 145, as the memory unit is recirculating. Namely, counter 170 counts the number of sampling periods (1024), thus performing a similar function to that of counter 135, which counts the number of the sampling periods during the sample mode. Similarly, an output counter 175 of stage 120 is connected to control circuit 145 to receive the "one" pulses therefrom. The readout stage 120 also includes a quantile detector unit 180 which, together with counter 170, is coupled to a coincidence comparator 185.

As previously defined, a quantile is a number Q representing a count of Q particles per second such that $100p$ percent of the number of observations contained Q or less particles.

The groups of second for which quantiles are to be derived for the example described herein are $r_1=69$, $r_2=298$, $r_3=726$ and $r_4=955$. These values are introduced in the unit 180 which is preset to energize the comparator therewith so that when the count in counter 170 equals any one of them, the comparator 185 actuates the counter 175 to transfer the count thereof to a transfer stage 190, from which the count is supplied to a transmission channel (not shown).

Figure 3:
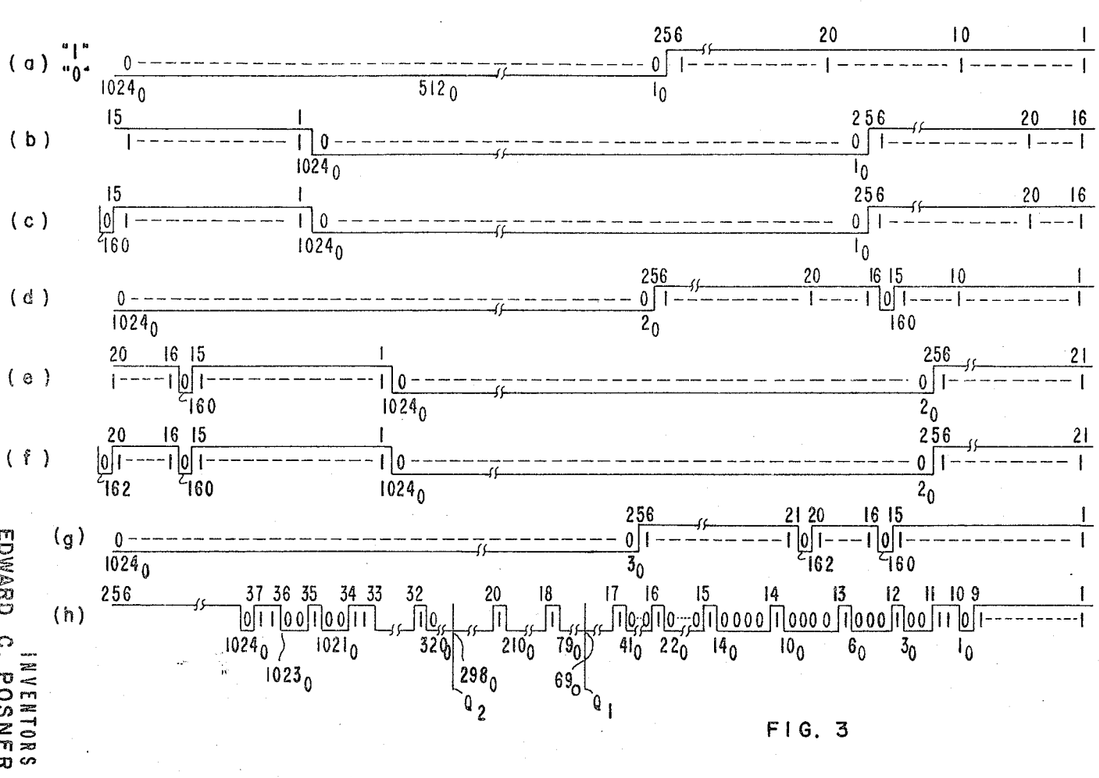
FIGURES 3(a) through 3(h) are waveform diagrams useful in explaining the operation of the memory stage shown in FIGURE 2.

During the readout or quantile mode, the memory stage 140 recirculates the memory unit 148 one complete cycle, during which zero pulses which represent sampling periods are supplied to counter 170, while one pulses representing counted particles per second are supplied to output counter 175. From FIGURE 3($h$), it should be appreciated that at some point during the circulation period, the count in sampling counter 170 would reach 41 (designated by numeral $41_0$ in FIGURE 3($h$)) while the count in output counter at that instant is only 16. During the next clock cycle, the count in output counter 175 would increase to 17. Then the zeroes stored after the 17th one will be supplied to sampling counter 170 until the count therein will equal 69 as indicated by line $Q_1$ in FIGURE 3($h$). At such time, the coincident comparator will actuate the output counter 175 to supply the count therein, i.e. seventeen to stage 190. Thus, the first quantile having a value seventeen is derived.

The memory unit 148 continues to circulate, and counters 170 and 175 continue to count the "zeroes" and "ones" respectively until the count in counter 170 reaches 298 as indicated by line $Q_2$. Then counter 175 in which a count of twenty is stored is energized (by 185) to transfer the count to stage 190, the latter count representing the second quantile. The third and fourth quantiles having values of 22 and 26 respectively are similarly derived when the count in counter 170 reaches 726 and 955.

From the foregoing description, it should thus be appreciated that in accordance with the novel teachings of the invention, only counters and comparing circuits are needed to store the number of events observed during each of a plurality of sampling periods in a serial memory unit. In the foregoing example, 1024 numbers each with a maximum value of 256 (i.e. 8-bits) are shown to be storable in a circulating memory unit of only 1280 memory bits whereas conventional storage techniques would have required 8192 bits. In addition, the data stored in the circulating memory unit can be conveniently read out in a very simple manner to produce the desired quantiles without needing complex arithmetic circuitry.

The ability to derive from the stored data a few quantiles from which the desired histogram or other statistical data may be derived is particularly desirable when the system is included in a space vehicle, since the use of quantiles greatly reduces the amount of data which has to be transmitted to the ground. Thus, the system for deriving quantiles can be thought of as a data compression system since it greatly reduces the amount of data to be transmitted without substantially affecting the information which may be derived therefrom as compared with the information which would have been derived had all the data (1024 8-bit words) been transmitted.

Figure 4:
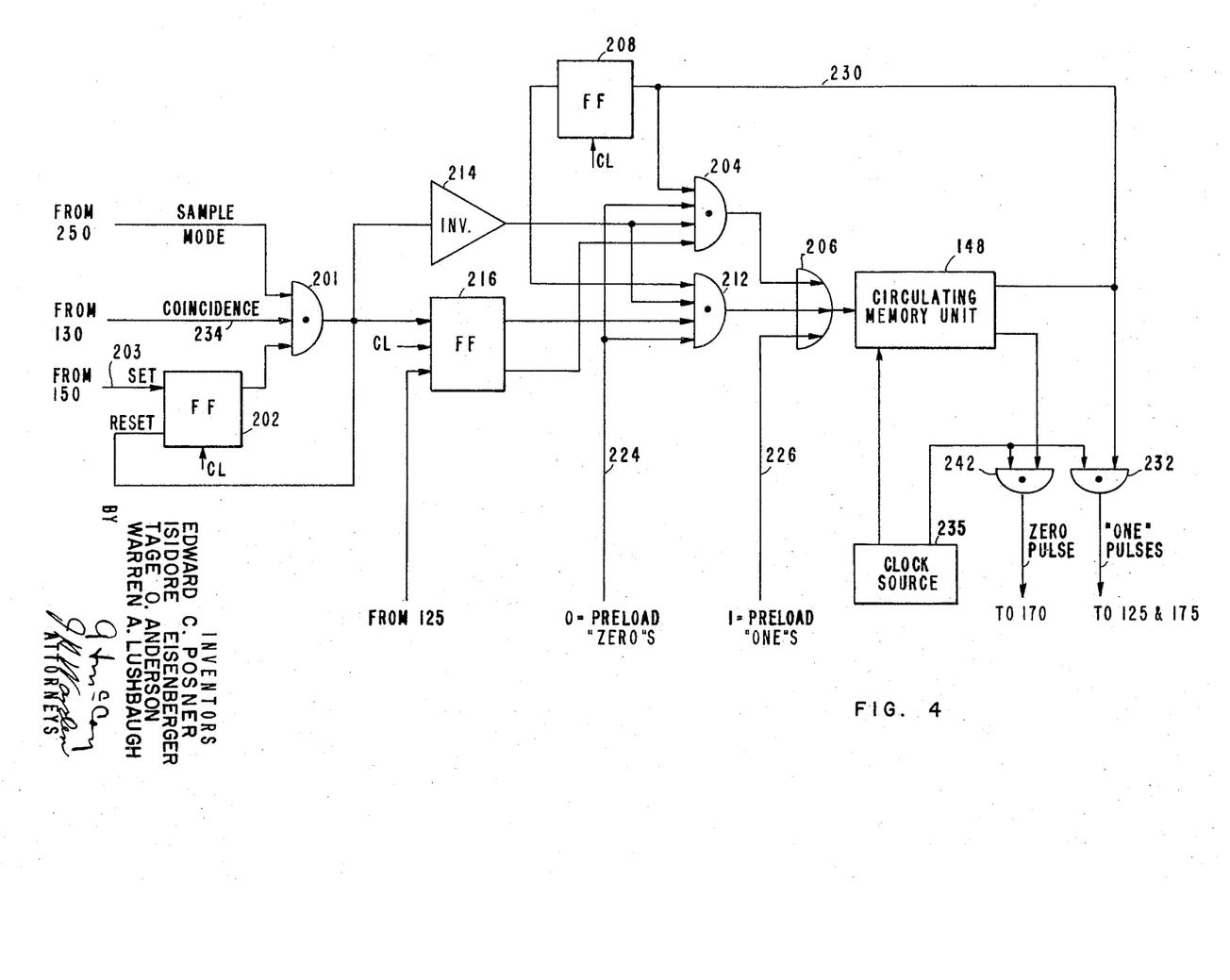
FIGURE 4 is a block diagram of the control circuitry of the memory stage.

Attention is now called to FIGURE 4 which is a block diagram of the memory stage 140 including the memory control circuit 145 and the circulating memory unit 148. In order to best explain the memory stage, let it be assumed that 256 consecutive ones and 1024 consecutive zeroes are stored in the memory unit 148 as diagrammed in FIGURE 3($a$). Thereafter, a sample mode signal is supplied to And gate 201 of the control circuit 148. One And gate 201 input is also connected to the set output line of a flip-flop (FF) 202 which has its reset input connected to the output of the And gate 201 and a set input connected to line 203 (FIGURE 2) from the control stage 150. The latter line is used to reset counter 105 and cause stage 115 to transfer the count of 105 to counter 110 as hereinbefore described.

The circulating memory unit 148 has its output connected to its input through an And gate 204 and Or gate 206, or through a flip-flop 208 and another And gate 212. The other inputs to gates 204 and 212 are the output of an inverter 214 whose input as well as the set input of a flip-flop 216 are connected to the output of gate 201. Also, an input of gate 204 is connected to the reset output of the FF216 while gate 212 has an input connected to the set output thereof. In addition, gates 204 and 212 have an input line 224 which inhibits the gates when zeroes are to be preloaded in the unit 148, while a line 226 provides pulses to active Or gate 206 when ones are to be preloaded in the unit 148.

During the initial phase of the sample mode, FF202 is in its reset state, and an "ON" level is provided in line 224. As long as And gate 201 is deactivated, inverter 214 activates And gate 204 so that the output of the unit 148 passes through line 230 back to its input through gates 204 and 206. Then, after the completion of a sampling period, flip-flop 202 is set. All this time the memory unit 148 has been circulating, providing counter 125 with "one" pulses which are supplied as the output of an And gate 232, having one input connected to the "one" output level of the unit 148 and the other to a clock source 235. When the count of "ones" in counter 125 equals the count in hold counter 110, a coincidence signal is supplied via a line 234 to gate 201. As a result, gate 201 is activated which causes inverter to inhibit gates 204 and 212, as well as prepare flip-flop 216 to be set during the next clock pulse. Consequently, a zero is stored in the memory unit 148 and the bit that would otherwise have been stored, enters flip-flop 208. Then, during the next clock cycle, two things occur. FF202 is reset, thus deactivating And gate 201 which in turn activates inverter 214 to enable gates 204 and 212. Coincidently, FF216 is set, deactivating gate 204 so that of the two (204 and 212) only gate 212 remains enabled. The data to the input of unit 148 is now being routed through FF208 and And gate 212. It is FF208 which provides the extra one bit storage capacity, hereinbefore referred to in conjunction with FIGURE 3($c$).

The data will continue to recirculate through the flip-flop 208 and gate 212 until the last "one" (256th) is counted by counter 125 at which time the counter reaches full scale (FS) and resets flip-flop 216. As a result, gate 212 is inhibited and gate 204 activated so that now the data no longer passes through the flip-flop 208, but rather directly through gates 204 and 206. Thus the bit in flip-flop 208 at the instant that flip-flop 216 is reset is removed from the line. Since this occurs after the last "one" bit, the bit being removed is the zero bit following the last "one." This is diagrammatically represented in FIGURE 3($d$) where the first zero following the last "one" after one zero (160) has been inserted among the "ones" is designated by $2_0$ rather than a $1_0$, as in FIGURE 2($b$).

It is thus seen that the output of inverter 214 which inhibits gates 204 and 212 for one clock period when coincidence is detected by 130 inserts the zero after the proper number of ones. Flip-flop 216 determines whether data from the unit 148 recirculates through gate 204 or through FF208 and gate 212. And, flip-flop 202, which is reset when gate 201 is activated, assures that only one zero (such as 160 in FIGURE 3($d$)) is inserted for each sampling period.

The memory unit 148 continues to recirculate and the input stage 100 continues to sample the particles received during each sampling period so that for each period a zero (such as 160 or 162 in FIGURE 3($g$)) may be inserted after the proper number of ones. Then at the end of 1024 periods, sampling counter 135, which is a 10-bit counter, supplies via a line 241 a full scale (FS) pulse to stage 150 indicating the completion of the sample mode. Thereafter the stage 150 provides a readout or quantile mode signal which activates the readout stage 120 so that during one complete cycle of reading out the content of memory unit 148, counters 170 and 175 count up all the ones and zeroes stored in the unit 148. The "zeroes" are supplied to counter 170 through an And gate 242 which is similar to gate 232 except that one of its inputs is connected to the zero output level of the unit 148 so that a zero pulse is supplied by gate 242 for each zero in the memory unit.

Figure 5:
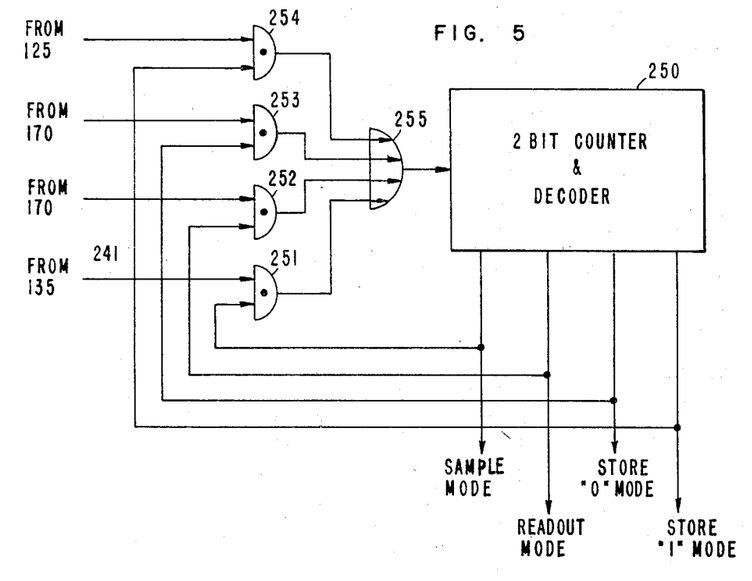
FIGURE 5 is a block diagram of the mode control circuit included in the control stage of FIGURE 2.

As previously explained, the major function of the control stage 150 is to control the system to operate during 1024 sampling periods in the sampling mode, as well as during the readout mode during which the quantiles are derived. Also the stage 150 controls the storing of successive zeroes and ones in the memory unit prior to recording the data sampled during a succeeding set of observation periods. One embodiment of the control stage 150 is diagrammed in FIGURE 5 to which reference is made herein. The stage 150 comprises a 2-bit counter and decoder 250 which produces any one of four successively generated mode signals designated as SAMPLE MODE, READOUT MODE, STORE "0" MODE, and STORE "1" MODE. Four And gates, designated by numerals 251 through 254, are connected through an Or gate 255 to the input of 250 so that when any one of the And gates is activated, it steps the counter 250 to produce a mode signal of the next successive mode. For example, when the system is in the sample mode, the counters of input stage 100 are activated. Similarly, a sample mode signal is supplied to one of the inputs of And gate 201 (FIGURE 4). Then at the end of the sample mode as indicated by the full scale (FS) pulse from counter 135 (FIGURE 2), And gate 251 is activated, stepping counter 250 to switch the system to the readout or quantile mode.

The end of the readout mode is sensed when the count in counter 170 reaches 1024, i.e. full scale. A full scale signal from this counter activates gate 252 which again steps counter 250 to switch the system to a store 0 mode. During this mode, 1024 are successively stored by inhibiting (via line 224) gate 204 during 1024 clock periods. At the end of the 1024 periods, which may be sensed by a full scale signal from 10-bit counter 170, gate 253 causes counter 250 to step once more and switch the system to a store 1 mode. During the latter mode 256 successive ones are stored by activating Or gate 206 (FIGURE 4) via line 226 during 256 successive clock periods. At the end of the 256 successive periods, which may be detected by a full scale pulse from 8-bit counter 125, gate 254 is activated resetting the 2-bit counter 250 to control the system to operate in the sample mode once more.

The control stage 150 in addition to the 2-bit counter and decoder 250 (FIGURE 5) and the various gates associated therewith, may further include additional conventional gating circuits to control the various circuits of stages 100 and 120 to operate only in the sample mode and readout mode respectively. This may be easily accomplished by using the sample mode output of counter 250 to activate the circuits of stage 100 and the readout mode output to activate the circuits of stage 120. In order to simplify FIGURE 2, the sample mode and readout mode outputs of counter 250 are diagrammatically connected to stage 100 and 120 respectively.

In the foregoing explanation, it has been assumed that the length of each sampling period is fixed at one second and that the maximum number of the events such as received particles which may be observed during such period is 256. Situations may arise, however, during which the number of particles received during each period may exceed the maximum of 256. On the other hand, in some cases, only very few particles may be received during each observation period. Thus, it is desirable to be able to vary the length of the observation period as a function of the number of particles received. If during each of predetermined number of observation periods, the count exceeds 256, it is desired to shorten the length of the observation period and if the maximum count observed during any of the observation periods is only a fraction of the maximum count of 256, such as 128, then it is desired to lengthen the observation period.

Figure 6:
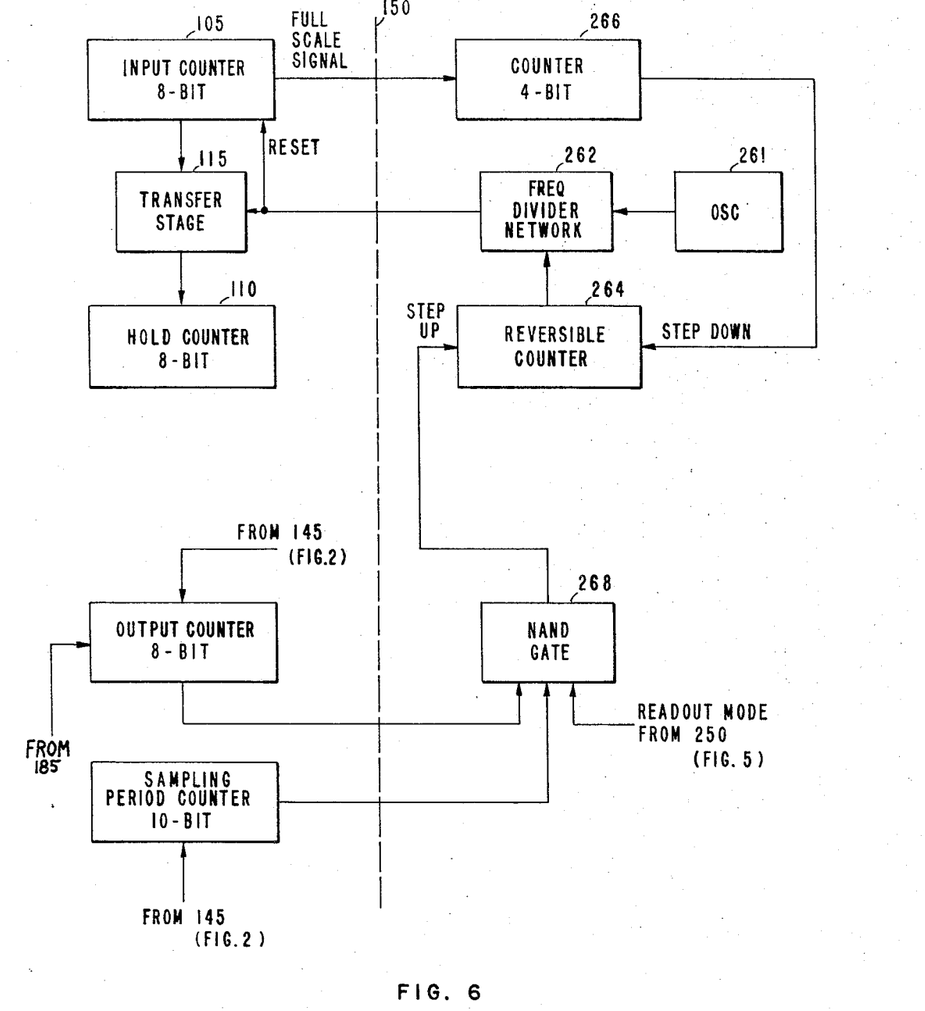
FIGURE 6 is a block diagram of other circuitry included in the control stage.

The circuitry necessary to control the length of the observation period as a function of particles received forms a part of control stage 150 and is diagrammatically shown in FIGURE 6 to which reference is made herein. The circuitry includes an oscillator 261 connected to a frequency divider network 262 which is controlled by the output of a reversible counter 264. Initially, the counter 264 has adjusted control network 262 so that a signal is supplied once each second to stage 115 and input counter 105 of input stage 100. Thus, the length of each observation period is one second. If during the sample mode, the counter in counter 105 reaches full scale, namely, at least 256 particles are received, then a full scale signal is supplied to a counter 266 shown to be of 4-bits. The full scale output of counter 266 is connected to the reversible counter 264.

The signal from counter 105 steps counter 266 so that if during each of 16 of the 1024 observation periods, the number of received particles is at least 256, counter 266 reaches full scale. Consequently, the reversible counter is energized to step down or shorten the length of each observation period. This is accomplished by reducing (via network 262) the time between successive signals which are supplied to reset counter 105 to cause stage 115 to transfer the count from counter 105 to hold counter 110. The output of counter 266 may also be used to reset the various stages in order to start a new sample mode operation of 1024 periods each one being of a shortened length.

The system of the present invention may further include a Nand gate 268 which is connected to step up the reversible counter 264 only in the absence of an activating signal on one of its input lines. One input line is connected to the full scale output line of sampling counter 170 of readout stage 120, another is connected to a selected bit in output counter 175, such as for example the seventh bit thereof, and the third to a readout mode signal. At the end of the readout mode, the count in counter 170 reaches full scale since this counter counts the 1024 zeroes in the memory unit 148 (FIGURE 2), so that a full scale signal is supplied therefrom to gate 268. If however at the same time the count in counter 175 has not reached 128, namely during none of the 1024 observation periods were 128 or more particles received, the absence of an activating signal from counter 175 would energize gate 268 to step up counter 264. As a result, the network 262 is energized to lengthen the interval between signals supplied to counter 105 and stage 115. Thus, by stepping up counter 264, each observation period is lengthened.

From the foregoing, it is thus seen that the circuit (FIGURE 6) incorporated in the control stage 150 provides automatic control of the duration of the observation period as a function of the number of particles received. If the number of particles received during each of a predetermined number of periods (such as 16) of the 1024 periods exceeds 256, the observation period is shortened. On the other hand, the period is lengthened if during none of the previous 1024 periods does the count of particles received equal or exceed a minimum value, such as 128.

Figure 7:
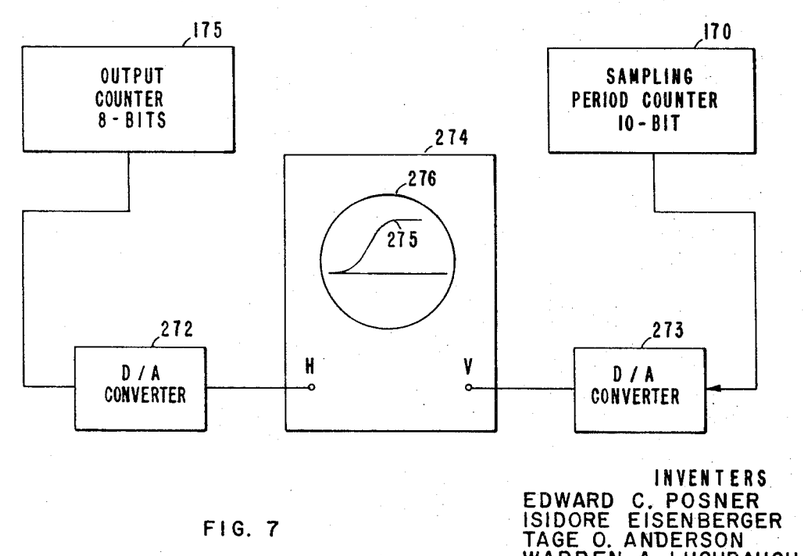
FIGURE 7 is a block diagram of display means which can be used with the data compression system of the present invention.

Herebefore, the teachings of the invention have been described in conjunction with a system for producing quantiles by receiving, storing, and subsequently reading out the number of particles received during each of 1024 periods. However, the system is not limited thereto. Reference is again made to counters 170 and 175 of the readout stage 120. It should be recalled that during the readout mode at any given instant, the count in counter 170 represents a number of observation periods and the count in counter 175 represents the maximum number of particles received during such a number of periods. Thus, as shown in FIGURE 7, to which reference is made herein, the two counters may be connected to digital-to-analog converters 272 and 273, the analog output of which is directly supplied to a display device such as an oscilloscope 274, which would automatically provide a visually displayed curve 275 on a display surface 276. Curve 275 is in essence the distribution function or the integral of the histogram of FIGURE 1.

Instead of displaying the distribution function represented by curve 275, the actual histogram may be directly displayed by resetting counter 170 (FIGURE 7) for each one received by counter 175 so that counter 170 counts the number of "zeroes" following each of the ones stored in the memory unit 148. Irrespective however of the characteristics of the displayed data, it can be directly photographed from the display surface 276 for future analysis. Also, it may be viewed by an operator to determine whether a system which produces the data operates within predetermined probability limits. Thus, the displayed data could be used for system monitoring and control.

Accordingly, there has been shown and described hereinbefore a novel system for recording and reading out data related to the number of events (such as particles) observed during each of a plurality of periods. The data may be directly used to provide quantiles from which desired statistical information may be derived. Also, the data may be visually displayed for analysis and control. It should be appreciated that those familiar with the art may make modifications in the arrangements as shown without departing from the true spirit of the invention. Therefore, all such modifications and equivalents are deemed to fall within the scope of the invention as claimed in the appended claims.

What is claimed is:

1. A system for recording and reading out data related to the number of events occurring during each of a predetermined number of periods comprising:

means for counting the number of events occurring during each of a predetermined number of periods;

serial memory means having a capacity of X memory bits, X being equal to the maximum number of events which may occur in any of said periods plus the number of periods;

memory control means for controlling the storing of either a first bit or a second bit in each of said X memory bits;

means for storing the number of events occurring during each period in said serial memory means as a first bit stored after a number of second bits equaling said number of events counted during each period; and readout means coupled to said memory control means for reading out each of said first bits and the number of second bits in said memory delay means which precede each of said first bits, to provide data related to the number of events occuring during each of said predetermined number of periods.

2. A system for storing the number of events observed during each of X periods, the maximum number of events observed during a period not to exceed Y comprising:

serial memory means of Z memory bits capacity, wherein each of said memory bits comprises a first or a second bit, Z being equal to $X+Y$;

means for storing in said serial memory delay means Y consecutive first bits and X consecutive second bits;

means for sensing the number of events observed during each of said X periods, said means for sensing include counting and comparing means for supplying signals to said control means to distribute said second bits among said first bits as a function of the number of events observed during each period; and control means responsive to said means for sensing for storing said X second bits among said Y first bits, whereby the number of first bits preceding a second bit represents the number of events observed during one of said X periods.

3. The system of claim 2 wherein said sensing means include first counting means for counting the number of events observed at one period of said X periods;

second counting means;

transfer means;

means for energizing said transfer means to transfer the count from said first counting means to said second counting means at the end of said one period, said means further include means for resetting said first counting means at the end of said one period to count the number of events during a subsequent period;

means for circulating said serial delay means to provide signals indicative of the Y consecutive first bits and X consecutive second bits stored therein;

third counting means for counting the signals indicative of said first bits; and comparing means for providing said control means with a comparison signal when the count in said second and third counting means is substantially equal.

4. The system of claim 3 wherein said means for resetting include means for varying the lengths of said X periods as a function of the number of events observed during each of said X periods.

5. The system of claim 3 wherein said means for resetting further include means for shortening the lengths of said X periods when the number of events observed during each of a predetermined number of said X periods exceeds said maximum Y number.

6. The system of claim 2 further including readout means coupled to said serial memory delay means for counting the number of first bits preceding each of said Y second bits to derive a predetermined number of quantiles, each quantile representing the maximum number of events observed in a predetermined number of said X periods.

7. The system of claim 2 further including:

means for serially reading out the first and second bits stored in said Z memory bits and providing first bit signals and second bit signals respectively related to the first bits and second bits; and first and second counting means for serially counting said first bit signals and said second bit signals respectively, whereby at any instant the count in said second counting means represents the number of periods during which a number of events equal to or less than the count in said first counting means were observed.

8. The system of claim 7 further including display means coupled to said first and second counting means for visually displaying a graph representative of the relationship of the number of events observed during each of said X periods and the number of periods during which the same number of events not to exceed Y have been observed.

9. A system for recording and reading out data comprising multibit words each being received at the end of another period in a predetermined sequence of X periods, each word not to exceed Y bits comprising:

circulating serial memory means of $X+2^Y$ memory bits including means for storing either a first bit or a second bit in each of said memory bits;

control means for storing a first bit in each of $2^Y$ consecutive memory bits;

input means for receiving each of said multibit words and energizing said control means to store a second bit in each of X memory bits, each second bit being stored in a memory bit following a number of memory bits in which first bits are stored equal in number to each received word; and output means for serially counting the first and second bits stored in said $X+2^Y$ memory bits in first and second counters respectively whereby the instantaneous count in said first counter represents the maximum value of multibit words received at the end of a number of periods equal to the instantaneous count in said second counter.

10. The system of claim 9 further including means including a display surface responsive to the instantaneous counts in said first and second counters for displaying on said display surface a two-dimensional curve relating the values of said multibit words and the number of periods at the end of which multibit words of equal number have been received.

11. The system of claim 10 wherein said output means further include means for comparing the count in said second counter with any one of a plurality of fixed counts and for providing the instantaneous counts of said first counter when the instantaneous count of said second counter equals any one of said fixed counts.

12. The system of claim 11 further including means for varying the length of each of said X periods as a function of the maximum and minimum values of said multibit words.

13. A system for storing X serially received numbers in a serial circulating memory unit of $X+Z$ bits, Z being the maximum value of the number to be stored comprising:

a serial circulating memory unit of $X+Z$ memory bits;

control means for storing a first bit in each of Y consecutive memory bits of said memory unit;

input means for serially receiving each of said X numbers; and means coupled to said control means for storing for each received number a second bit in a memory bit following a number of memory bits in which first bits equal to said received number are stored.

14. The system of claim 13 wherein said input means include an input counter for counting each of said received X numbers;

means including a hold counter for transferring the count of said input counter to said hold counter;

means for counting the number of memory bits wherein a first bit is stored and comparing means for providing a signal to said control means when the count in said hold counter and said means for counting is the same.

References Cited
UNITED STATES PATENTS

| | | | |
|---|---|---|---|
| 3,061,672 | 10/1962 | Wyle | 235—92 X |
| 3,102,199 | 8/1963 | Zito | 250—88.3 |
| 3,123,714 | 3/1964 | Chope | 250—199 |
| 3,144,638 | 8/1964 | Hesler et al. | 340—172.5 X |
| 3,185,823 | 5/1965 | Ellersick et al. | 235—154 |
| 3,185,824 | 5/1965 | Blasbalg et al. | 235—154 |
| 3,213,268 | 10/1965 | Ellersick | 235—154 |
| 3,237,170 | 2/1966 | Blasbalg et al. | 340—172.5 |
| 3,311,893 | 3/1967 | Landell | 340—172.5 |

PAUL J. HENON, *Primary Examiner.*